(12) United States Patent
Kim

(10) Patent No.: US 8,961,890 B2
(45) Date of Patent: Feb. 24, 2015

(54) PURIFYING APPARATUS USING PHOTOCATALYTIC SHEET

(75) Inventor: Kyung-Sook Kim, Gyeongsangnam-do (KR)

(73) Assignee: Kyung-Sook Kim, Gyeongsangnam-Do (KR)

( * ) Notice: Subject to any disclaimer, the term of this patent is extended or adjusted under 35 U.S.C. 154(b) by 153 days.

(21) Appl. No.: 12/734,827

(22) PCT Filed: Dec. 9, 2008

(86) PCT No.: PCT/KR2008/007268
§ 371 (c)(1),
(2), (4) Date: May 25, 2010

(87) PCT Pub. No.: WO2009/096662
PCT Pub. Date: Aug. 6, 2009

(65) Prior Publication Data

US 2010/0303679 A1  Dec. 2, 2010

(30) Foreign Application Priority Data

Jan. 30, 2008 (KR) .................. 10-2008-0009550

(51) Int. Cl.
| | | |
|---|---|---|
| *B01J 19/08* | (2006.01) | |
| *B01D 53/88* | (2006.01) | |
| *C02F 1/32* | (2006.01) | |
| *C02F 1/72* | (2006.01) | |

(52) U.S. Cl.
CPC .............. *B01D 53/885* (2013.01); *C02F 1/325* (2013.01); *C02F 1/725* (2013.01); *B01D 2251/104* (2013.01); *B01D 2255/802* (2013.01); *B01D 2257/708* (2013.01); *B01D 2259/802* (2013.01);*B01D 2259/804* (2013.01); *C02F 2201/3227* (2013.01); *C02F 2201/328* (2013.01); *C02F 2305/10* (2013.01)
USPC .................. 422/186.3; 422/186; 210/748.01; 210/748.1; 210/748.14

(58) Field of Classification Search
CPC ........... B01D 53/885; B01D 2251/104; B01D 2255/802; B01D 2257/708; B01D 2258/804; C02F 1/325; C02F 1/725; C02F 2305/10; C02F 2201/3227; C02F 2201/328
USPC ............... 422/186, 186.3; 210/748.01, 748.1, 210/748.14
See application file for complete search history.

(56) References Cited

U.S. PATENT DOCUMENTS

| 7,485,799 | B2 * | 2/2009 | Guerra ......................... 136/245 |
|---|---|---|---|
| 2003/0178296 | A1 * | 9/2003 | Kato et al. ............... 204/157.15 |
| 2004/0026337 | A1 * | 2/2004 | Veenstra et al. .............. 210/748 |
| 2005/0008549 | A1 * | 1/2005 | Hsu ............................... 422/186 |
| 2005/0186124 | A1 * | 8/2005 | Fink et al. ..................... 422/121 |

FOREIGN PATENT DOCUMENTS

| JP | 2002-058728 | 2/2002 |
|---|---|---|
| JP | 2002-192123 | 7/2002 |

(Continued)

*Primary Examiner* — Xiuyu Tai
(74) *Attorney, Agent, or Firm* — Jordan and Hamburg LLP

(57) ABSTRACT

Provided is a purifying apparatus, which includes ultraviolet lamps and an ozone lamp having different wavelengths from one another and disposed in tubes to remove bacteria, VOC, bad odors in water or air, and these tubes are arranged in a serial or parallel way. Folds are formed at inner ends of the spiral photocatalytic sheets which are in contact with the lamps and the respective lamps are inserted into to increase the contact area with air or water and the one with the lamp, thereby preventing the lamp from being damaged. The purifying apparatus includes: an outer case having an inlet and an outlet; a spiral photocatalytic sheet to be inserted into the outer case; a UV lamp to be inserted into the spiral photocatalytic sheet, wherein folds are disposed at an inner side of the spiral photocatalytic sheet where a space for inserting the UV lamp is formed.

7 Claims, 4 Drawing Sheets

(56) References Cited

FOREIGN PATENT DOCUMENTS

| JP | 2006-068639 | | 3/2006 |
| JP | 2003-053143 | * | 2/2012 |
| JP | 2002-11992 | * | 4/2012 |
| KR | 20-0254611 | | 11/2001 |
| KR | 10-02671232 | | 1/2007 |

* cited by examiner (a)    (b)

ic sheets, and in particular, to a purifying appa-
PURIFYING APPARATUS USING PHOTOCATALYTIC SHEET

BACKGROUND OF THE INVENTION

The present invention relates to a purifying apparatus using photocatalytic sheets, and in particular, to a purifying apparatus using photocatalytic sheets, which includes ultraviolet lamps and an ozone ($O_3$) lamp which have different wavelengths from one another and are disposed in respective and separate tubes to effectively remove bacteria, volatile organic compounds (VOC), bad odors included in water or air, and these tubes are arranged in a serial or parallel way. Folds are formed at inner ends of the spiral photocatalytic sheets which are in contact with the lamps and the respective lamps are inserted into to increase the contact area with air or water and the contact area with the lamp, thereby preventing the lamp from being damaged.

Document 1 Korean Patent Registration No. 0671232 on Jan. 12, 2007

Document 2 Korean Utility Registration No. 0254611 on Nov. 7, 2001

In general, a purifying apparatus has been known, which allows a semiconductor used as an electrode to be contacted with $TiO_2$ having chemical stability and facilitating treatment and supply, and irradiates UV light output from a UV lamp onto a photocatalyst separated by holes and having positive and negative charges, so that hydration radicals generated at this time carry out sterilization and deodorization.

Such a purifying apparatus allows the photocatalytic sheet coated with the photocatalyst to be plurally stacked to purify air or water passing through the sheets. However, such a structure occupies a large volume so that its efficiency is low.

Document 2 is intended to obtain a high efficiency in a small space, which corresponds to the case that the photocatalytic sheet has a spiral shape. Accordingly, there occur many contacts between air or water and the photocatalytic sheet while the air or water flows along the spiral passage formed by the photocatalytic sheet.

However, even when the spiral-shaped purifying apparatus uses one spiral photocatalytic sheet, its contact area is not sufficiently large. The structure using one UV lamp makes it difficult to obtain a significant sterilizing effect. That is, the sterilizing abilities become different from each other depending on the light wavelengths irradiated from the UV lamp, and VOC removal or deodorization becomes also different.

None the less, the conventional case has a weak sterilizing ability even though it uses the UV lamp having a large range of wavelengths to save the space.

An inner end of the spirally wound photocatalytic sheet is direct contact with the UV lamp. Accordingly, the sharp contact end may damage the UV lamp at the time of producing, assembling, disassembling, or repairing the lamp.

In addition, according to the conventional art, purification of water or air depended on the spiral photocatalytic sheet only. This was due to the fact that the photocatalyst could not be coated on other portions of the purifying apparatus.

In particular, the case has a small inner diameter and a long length so that the photocatalyst could not be coated on the inner side of the outer case, that is, the inner side of the outer case where the photocatalyst and the UV lamp are to be inserted.

In view of the problems mentioned above, the present invention is thus directed to a spiral photocatalytic sheet, which allows its structure to be changed to more increase the contact area with water or air and to prevent the UV lamp from being damaged in a portion in direct contact with the lamp.

In addition, UV lamps having respective different wavelengths optimized for sterilization, deodorization, and purification are coupled with each other in order to increase the ability of purifying water or air.

In addition, a photocatalytic tube is inserted between the spiral photocatalytic sheet and the outer case for allowing more water or air to be in contact with the photocatalyst and a spiral photocatalytic sheet and a UV lamp are inserted therein so that the purification ability is enhanced.

SUMMARY OF THE INVENTION

One aspect of the present invention is to provide a purifying apparatus using a photocatalytic sheet, which includes an outer case having an inlet and an outlet; a spiral photocatalytic sheet to be inserted into the outer case; an ultraviolet (UV) lamp to be inserted into the spiral photocatalytic sheet, wherein folds are disposed at an inner side of the spiral photocatalytic sheet where a space for inserting the UV lamp is formed.

According to the present invention, folds are arranged at an inner end of a spiral photocatalytic sheet, so that the inner end acts to prevent a UV lamp from being damaged at the time of lamp production, and a contact with water or air is increased by the folds to enhance the purification.

A photocatalytic tube is also disposed in combination with the spiral photocatalytic sheet, so that the conventional drawback that an inner surface of the outer case cannot be coated with the photocatalyst can be overcome, thereby increasing the purification as much as possible.

In addition, a plurality of UV lamps and ozone lamps having wavelengths suitable for purification, VOC removal, deodorization, and so on, are disposed so that the purification can be enhanced.

Further, a plurality of UV lamps are arranged to enhance the purification so that the ozone can be removed. Therefore, the ozone lamp, which could not be used due to the occurrence of ozone having a strong but harmful sterilizing power can be disposed and used.

DESCRIPTION OF THE PREFERRED EMBODIMENTS

Figure 1:
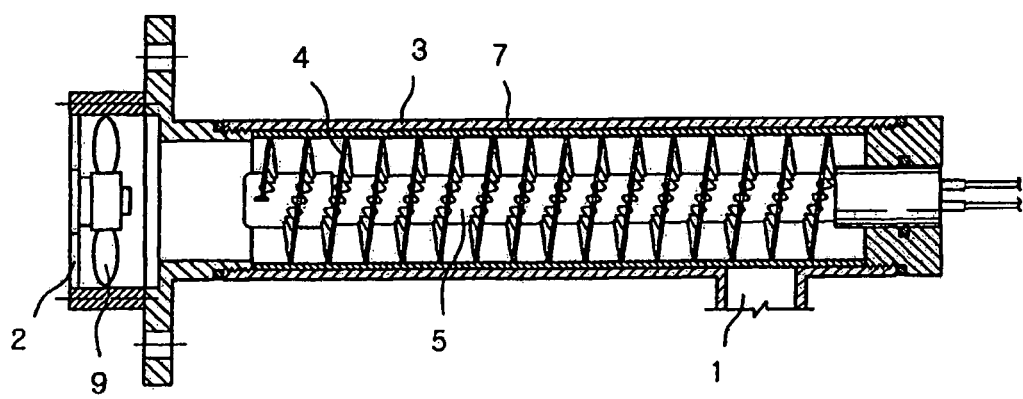
FIG. 1 illustrates a cross-section of an exemplary embodiment of the present invention.

The present invention provides a purifying apparatus using a photocatalytic sheet, which includes: an outer case 3 having an inlet 1 and an outlet 2; a spiral photocatalytic sheet 4 to be inserted into the outer case 3; a UV lamp 5 to be inserted into the spiral photocatalytic sheet 4, wherein folds 6 are disposed at an inner side of the spiral photocatalytic sheet 4 where a space for inserting the UV lamp 5 is formed.

The folds 6 may be arranged over the entire spiral photocatalytic sheets 4, or may be formed partially in predetermined portions of the inner side.

Figure 3:
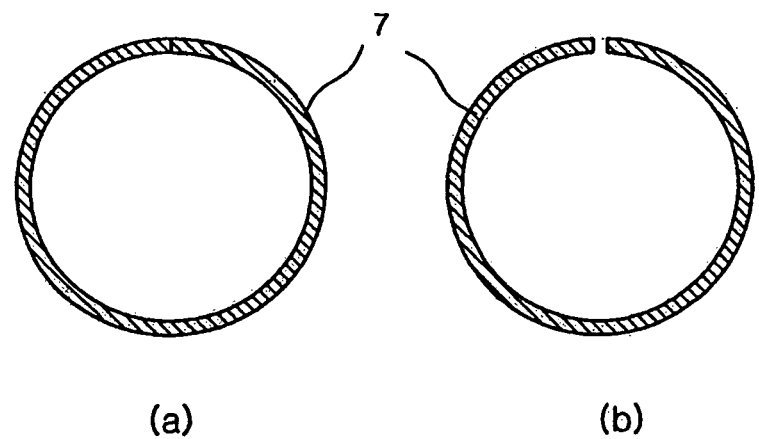
FIG. 3 illustrates the cross-section taken along the A-A line of FIG. 2.

A photocatalytic tube 7 coated with the photocatalyst is inserted between the outer case 3 and the spiral photocatalytic sheet 4. The photocatalytic tube 7 may be formed of any material such as paper, metal, nonferrous metal, synthetic resin, or rubber, and is coated with the photocatalyst such as $TiO_2$ on its surface. Such a photocatalytic tube 7 is preferably rolled in a round way when tile planar plate is coated with the photocatalyst and is inserted into the outer case 3, and may have the cross-section as shown in FIG. 3.

Sanding, shot blasting, chemical corrosion, or thermal spraying is preferably carried out on the surface of the spiral photocatalytic sheet 4 or the photocatalytic tube 7 for increasing the efficiency of the photocatalytic coating and facilitating photocatalyst adhesion and deposition.

The outer cases 3 are coupled to each other by the coupling tubes 8 in a serial or parallel way, and inserted into the outer cases 3 are the UV lamps having different wavelengths from each other, the UV lamp 5 and a visible light lamp having different wavelengths from each other, the UV lamp 5 and an ozone lamp having different wavelengths from each other, or the UV lamp 5, a visible light lamp, and an ozone lamp having different wavelengths from each other, so that the purification can be carried out on a wavelength basis.

That is, the inlet 1 and the outlet 2 are formed in the outer case 3, so that the inlet 1 and the outlet 2 of the outer case 3 disposed between the outer cases become the coupling tube 8 altogether.

In either case of having one outer case 3 or a plurality of outer cases 3 coupled to each other, a fan 9 or a pump may be attached to any one of the outer cases 3, or may be arranged anywhere on the flow passage of the water or air. It is also possible to have no fan 9 or pump when the flow pressure of the water or air exists.

The outlet 2 may be formed in the fan 9. In this case, the outer case 3 does not have the outlet 2.

Figure 5:
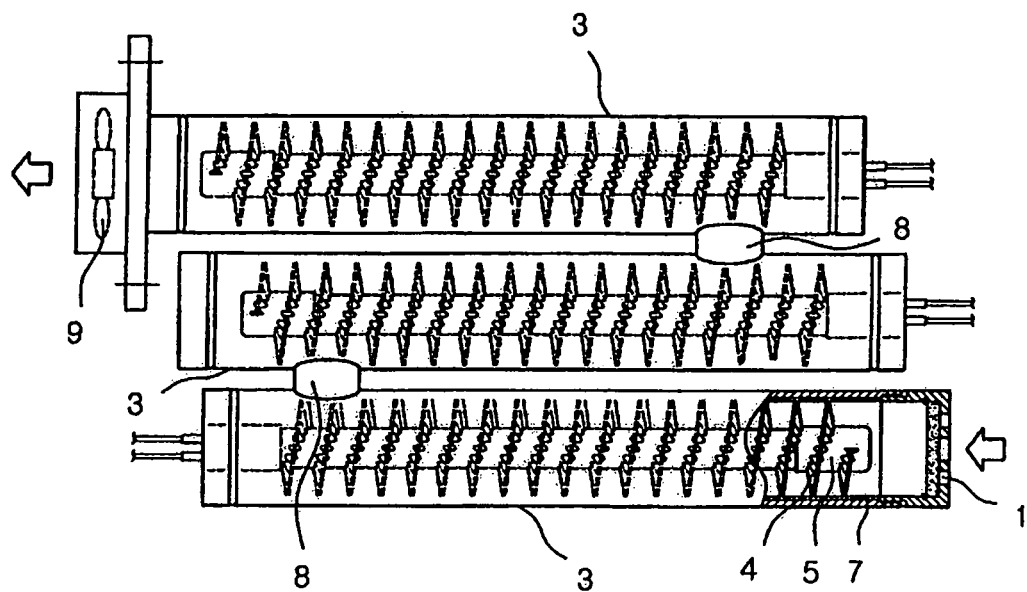
FIGS. 5 to 7 illustrate exemplary embodiments including a plurality of outer cases.
Figure 6:
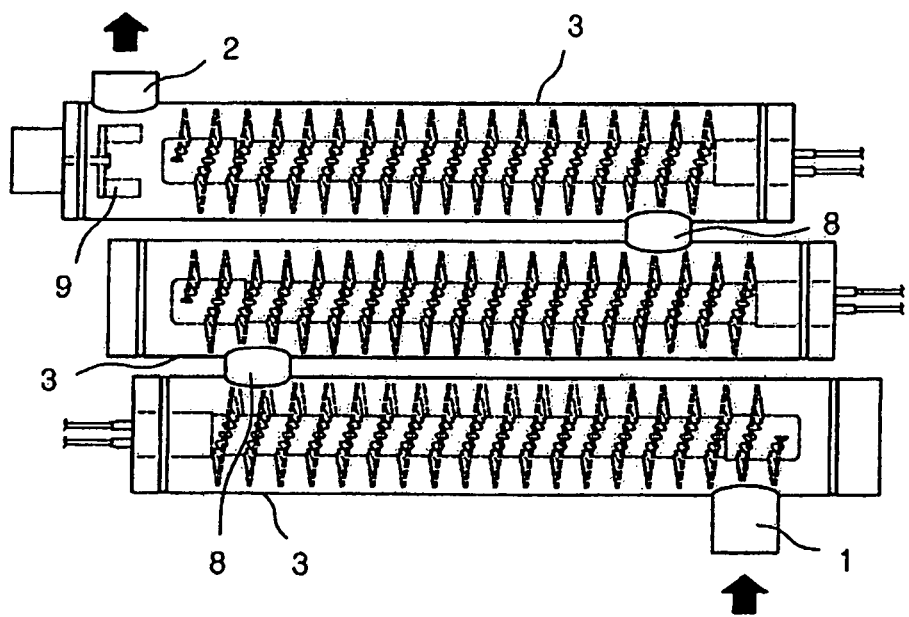
Figure 7:
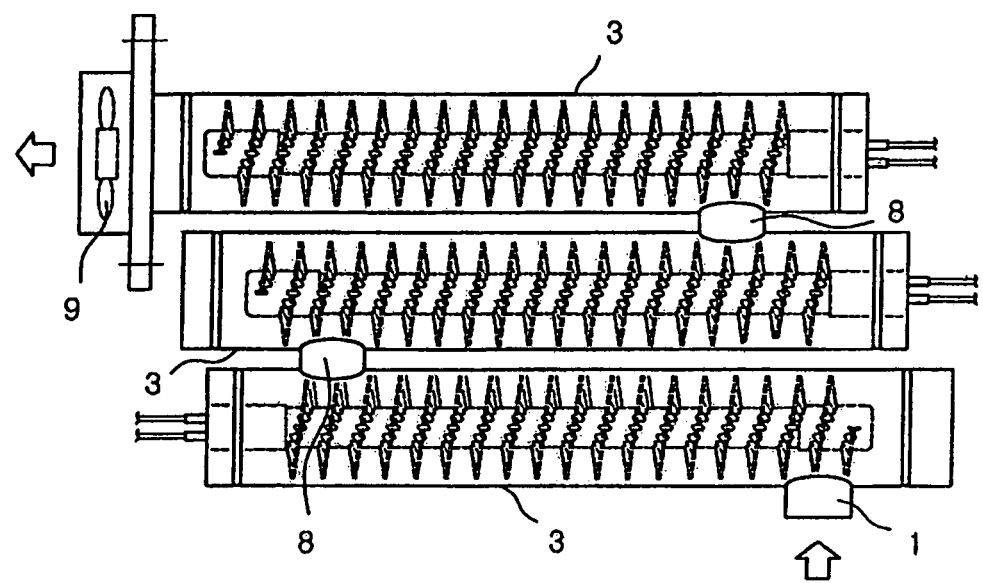

The purifying apparatus having one outer case 3 as described above is shown in FIGS. 1 and 2, and the purifying apparatus using the UV lamp 5 and the visible light lamp with different wavelengths from each other and a plurality of outer cases 3 is shown in FIGS. 5 to 7.

Figure 2:
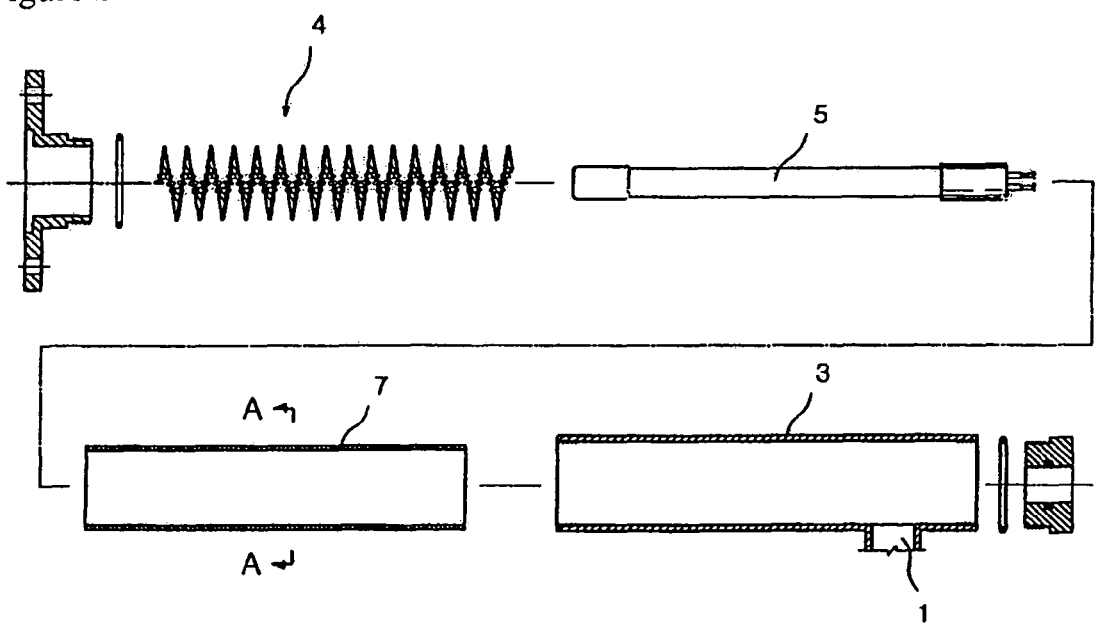
FIG. 2 illustrates a disassembled state of an embodiment of the exemplary embodiment of the present invention.

First, the case using one outer case 3 is shown in FIGS. 1 and 2 in detail. Referring to FIG. 1, the outlet 2 is formed not in the outer case 3 but in the fan 9. However, an opening of one side of the outer case 3 may be the outlet 2 even in this case. Accordingly, the outer case 3 having the inlet 1 and the outlet 2 does not necessarily means that the wall of the outer case 3 is penetrated. The spiral photocatalytic sheet 4, the photocatalytic tube 7, and the outer case 3, which are coated with the photocatalyst, are shown in FIGS. 1 to 4. Various photocatalysts including $TiO_2$ are coated on the photocatalytic sheet to allow the photochemical reaction to occur from light irradiated by the visible light lamp or the UV lamp 5 so that the contaminated water or air flowing through the outer case can be purified, deodorized, or sterilized.

The spiral photocatalytic sheet 4 may have both smooth surfaces and preferably has a fold shape for increasing the reaction efficiency and stability. That is, the spiral photocatalytic sheet 4 has an overall fold shape such as ripples, which are spirally wound. The spiral photocatalytic sheet may have the folds 6 where only inner ends of the photocatalytic sheet are in contact with the UV lamp 5 as shown in FIG. 4.

Figure 4:
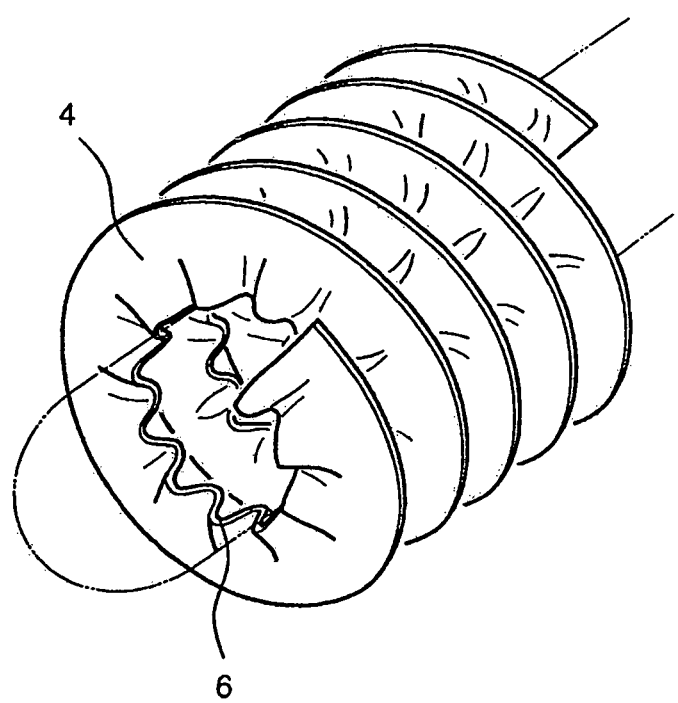
FIG. 4 illustrates a detailed perspective view of spiral photocatalytic sheets.

The folds 6 formed in the inner ends are locations in contact with the UV lamp 5 as shown in FIG. 4, which act to prevent the UV lamp 5 from being damaged at the time of assembly or use. Regardless of the smooth shape or the folded shape of the folds in the spiral photocatalytic sheet 4, at least one vent hole may also be formed in the spiral photocatalytic sheet 4 for adjusting the reaction and the flow of water or air.

The folds 6 allow the overall reaction area to be increased. In addition, the contact area with the water or air is increased and the contact area with the UV lamp 5 is increased by the curve of the folds 6 in comparison with the conventional straight line-shaped case, so that the UV lamp 5 can be prevented from being damaged. That is, there were no folds 6 so that the sheet had a sharp straight line shape in the conventional art. Accordingly, the UV lamp 5 was damaged by the contact impact with the UV lamp 5. However, according to the present invention, the portions in contact with the UV lamp 5 become the folds 6, so that the contact area is significantly increased to disperse the impact, thereby protecting the UV lamp 5.

The spiral photocatalytic sheet 4 is assembled with other components as shown in FIG. 2, and a plurality of the spiral photocatalytic sheets assembled with the components are shown in FIGS. 5 to 7. FIG. 5 illustrates the case that one side of the lower outer case 3 positioned becomes the inlet 1 and the outlet 2 is formed in the fan 9 or pump. FIG. 6 illustrates the case that the inlet 1 and the outlet 2 are formed in the lower and upper outer cases 3, respectively. FIG. 7 illustrates the case that the inlet 1 is separately formed in the lower outer case 3. Purification of water or air will now be described based on the structure where outer cases 3 as described above are coupled to each other.

The contaminated water or air flows through the inlet 1, and this fluid flow results from the delivery pressure of the fan 9, pump, or the fluid itself. The fluid rotates around the UV lamp 5, because it flows along the screw-shaped passage formed by the spiral photocatalytic sheet 4.

Accordingly, light emitted from the UV lamp 5 is subjected to photochemical reaction with the photocatalysts coated on the spiral photocatalytic sheet 4 and the photocatalytic tube 7 to carry out the purification.

The spiral photocatalytic sheet 4 has folds so that the purification is enhanced over the conventional art and is more enhanced by the photocatalytic tube 7. The fluid flows through the sequential outer cases 3 to be purified or sterilized by the UV lamps having different wavelengths from each other, and is also purified by the visible light lamp or the ozone lamp.

That is, the structure including a plurality of outer cases 3 coupled to each other is intended to discriminate respective functions and reaction effects and to increase the efficiency. Accordingly, the disposed UV lamps 5 are characterized in that they have different wavelengths from each other.

That is, deodorizing, organic material decomposing, sterilizing, and antibiotic functions are different from each other depending on wavelengths of the UV light and the visible light or the photocatalytic material, so that lamps having different major functions as described above can be coupled to each other to simultaneously obtain the purification of the water or air and the sterilization.

Accordingly, lamps having different UV wavelengths are disposed and used. In general, the UV lights are classified into UV-A (315 to 400 nm), UV-B (280 to 315 nm) and UV-C (200 to 280 nm), and the UV lamps 5 for irradiating the UV light based on the wavelength ranges listed above are used to allow respective functions to be simultaneously carried out or to be separately subjected to photochemical reaction and then to use resultant effects. That is, the lamps may be arranged in a serial way, or in a parallel way as shown in FIGS. 5 to 7.

For example, the UV lamp 5 of the UV-A (315 to 400 nm) range, the UV lamp 5 of the UV-B (280 to 315 nm), and the UV lamp 5 of the UV-C (200 to 280 nm) may be sequentially arranged upwardly in FIG. 5. The arrangement order may be changed, and the ozone lamp may be disposed in the first stage or between the UV lamps 5. According to the lamps having different UV light wavelengths as described above, they may be classified into ones suitable for sterilization, ones suitable for deodorization, and ones suitable for VOC decomposition, so that the resultant effects can also be increased. In contrast, according to the conventional art, only one UV lamp 5 having one available wavelength range is employed so that the purification ability was not sufficient in comparison with the present invention using the lamps having different wavelengths from each other.

As such, the photocatalytic reaction effect is increased by the multi-stage connection, since the ozone lamp and the UV lamps 5 having different wavelengths and thereby different effects from each other sequentially purify water or air. It is also possible to add the visible light lamp and the ozone lamp along with the UV lamps 5.

In the case of ozone lamp, the acceptable amount of ozone was regulated since the ozone harmful to human body remains, so that is was not possible to use the ozone lamp having a high sterilizing ability, since the regulation range of the acceptable amount of remaining ozone could not be easily met. However, according to the present invention, a plurality of UV lamps 5 having different wavelengths are employed so that the ozone lamp can be used. That is, the ozone generated by the ozone lamp can be removed by the subsequent UV lamp 5 so that the acceptable amount of remaining ozone can be met.

In addition, when the ozone lamp is disposed between the UV lamps 5 or is disposed to precede the UV lamp 5, the generated ozone can be photochemically decomposed and removed by the subsequent UV lamp 5 and the visible light lamp or by the combined structure.

The present invention employs a plurality of UV lamps 5 and the visible light lamp coupled with each other and having different wavelengths from each other as described above, so that the ozone lamp can be used, and functions of the respective UV lamps having different wavelengths can be more actively utilized to enhance the purification.

The invention claimed is:

1. A purifying apparatus using a photocatalytic sheet comprising:
   an outer case having an inlet and an outlet;
   a photocatalytic tube disposed within the outer case, the photocatalytic tube defining a longitudinal axis;
   a fan disposed adjacent the outlet for controlling a fluid or air flow through the purifying apparatus;
   a photocatalytic sheet inserted into the photocatalytic tube; and
   an ultraviolet UV lamp inserted into the photocatalytic tube and extending along the longitudinal axis; and
   wherein the photocatalytic sheet has a thickness less than a width of the photocatalytic sheet, and the width is less than a length of the photocatalytic sheet;
   wherein the photocatalytic sheet spirals to form a spiral body extending along said longitudinal axis, the spiral body having an axial passage along said longitudinal axis and within which the ultraviolet UV lamp is located;
   wherein the spiral body is in a shape consisting of:
   an outer edge extending the length of the photocatalytic sheet, the outer edge having a smooth spiral shape for an entire length of the spiral body;
   an inner edge extending the length of the photocatalytic sheet trending spirally for the entire length of the spiral body while undulating along the length so that the inner edge elevates in an undulating manner from the smooth spiral shape; and
   a plurality of folds causing deviation from the smooth spiral shape, wherein each fold among said plurality of folds originates as an undulation at said inner edge and extends in the width direction from the inner edge toward the outer edge while ending before reaching the outer edge, and wherein all deviation from the smooth spiral shape of the spiral body consists of said plurality of folds.

2. The apparatus according to claim 1, comprising a plurality of said outer cases coupled with each other by coupling tubes, and a lamp in each one of the plurality of outer cases providing the apparatus with a plurality of lamps including said UV lamp, the lamps having different wavelengths from each other and being inserted into the outer cases.

3. The apparatus according to claim 1, comprising a plurality of said outer cases coupled with each other by coupling tubes, and UV lamps having different wavelengths from each other being inserted into the outer cases.

4. The apparatus according to claim 1, comprising a plurality of said outer cases coupled with each other by coupling tubes, and UV lamps having different wavelengths from each other being inserted into the outer cases, the UV lamps and a visible light lamp having different wavelengths from each other.

5. The apparatus according to claim 1, comprising a plurality of said outer cases coupled with each other by coupling tubes, and UV lamps having different wavelengths from each other being inserted into the outer cases, the UV lamps and an ozone lamp having different wavelengths from each other.

6. The apparatus according to claim 2, wherein said plurality or lamps comprises a visible light lamp.

7. The apparatus according to claim 2, wherein said plurality of lamps comprises an ozone lamp.

* * * * *